Figure 1:
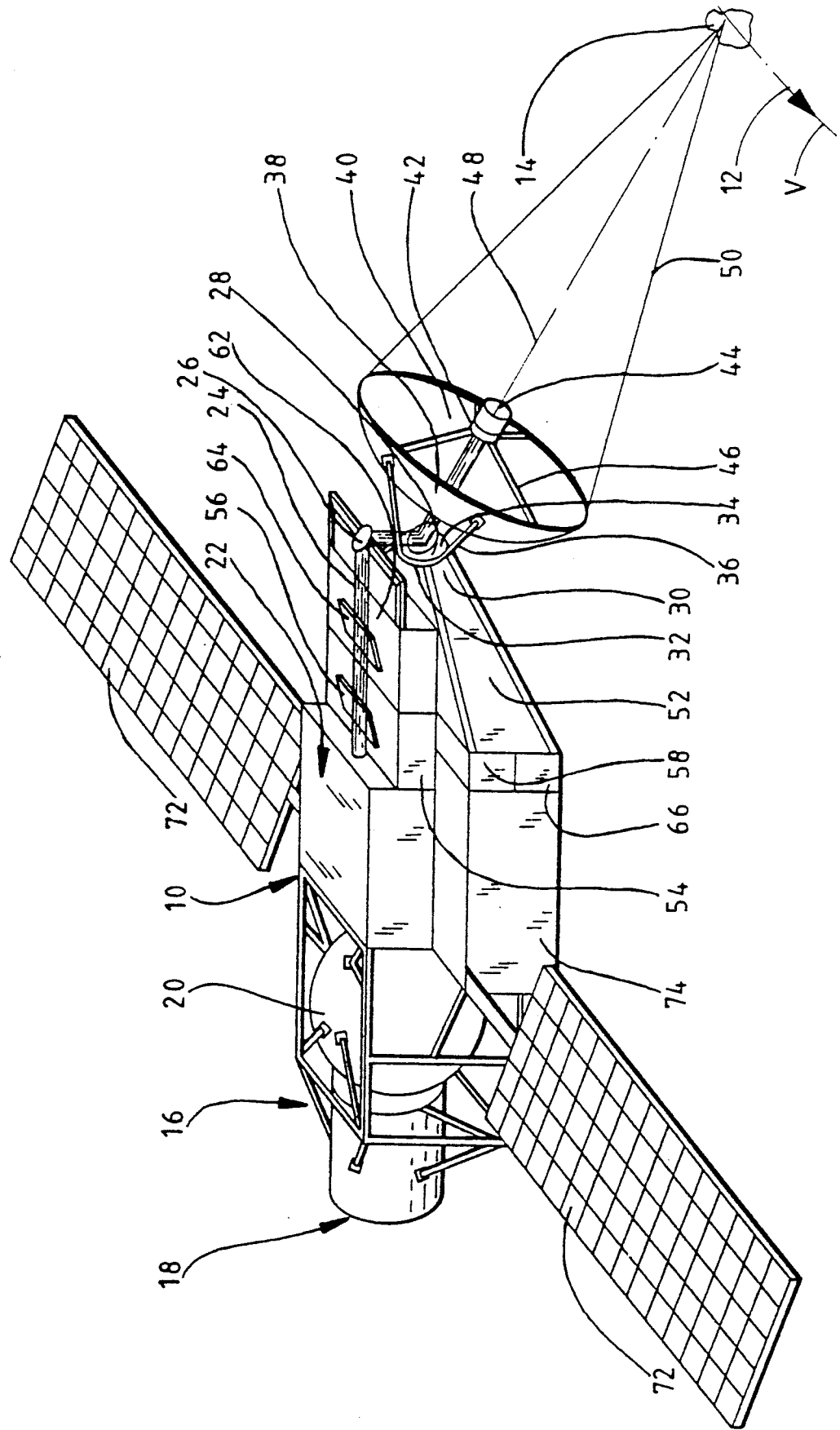

United States Patent [19]

Schall

[11] Patent Number: 5,153,407
[45] Date of Patent: Oct. 6, 1992

[54] METHOD AND DEVICE FOR REMOVING SPACE DEBRIS

[75] Inventor: Wolfgang Schall, Waldenbuch, Fed. Rep. of Germany

[73] Assignee: Deutsche Forschungsanstalt fuer Luft- und Raumfahrt e.V., Fed. Rep. of Germany

[21] Appl. No.: 631,386

[22] Filed: Dec. 20, 1990

[30] Foreign Application Priority Data

Dec. 30, 1989 [DE] Fed. Rep. of Germany ....... 3943374

[51] Int. Cl.$^5$ .............................................. B23K 26/00
[52] U.S. Cl. .............................. 219/121.6; 219/121.85
[58] Field of Search .......................... 219/121.6, 121.85

[56] References Cited

U.S. PATENT DOCUMENTS

| | | | |
|---|---|---|---|
| 3,150,363 | 9/1964 | Finvold | 343/5 |
| 3,427,611 | 2/1969 | Enenstein | 343/6 |
| 3,514,776 | 5/1970 | Mulready | 219/121.74 |
| 4,395,616 | 7/1983 | Smith et al. | 219/121.74 |
| 4,670,637 | 6/1987 | Morrison et al. | 219/121.61 X |
| 4,991,799 | 2/1991 | Petro | 244/158 R |

FOREIGN PATENT DOCUMENTS 2853695 5/1985 Fed. Rep. of Germany .

OTHER PUBLICATIONS

Joseph P. Loftus, Jr., "Orbital Debris for Upper-Stage Breakup", American Institute of Aeronautics and Astronautics, Inc. vol. 121 (Progress in Astronautics and Aeronautics), Copyright 1989, pp. 169-175.

Primary Examiner—C. L. Albritton
Attorney, Agent, or Firm—Barry R. Lipsitz

[57] ABSTRACT

To provide a method and a device for removing a piece of debris moving in space at an orbital velocity in an orbit about the earth which function as simply as possible and are economical, it is proposed that the piece of debris be irradiated with radiation to bring about vaporization of the debris material, and that the piece of debris be removed from its orbit about the earth by the vaporization of the material, and that the device comprise a radiation source for generating the radiation which brings about the vaporization of the debris material, and that an aiming means be provided for applying the radiation to the piece of debris moving in the orbit about the earth.

31 Claims, 3 Drawing Sheets

METHOD AND DEVICE FOR REMOVING SPACE DEBRIS

The invention relates to a method of removing a piece of debris moving in space at an orbital velocity in an orbit about the earth.

The invention further relates to a device for space vehicles for removing a piece of debris moving in space at an orbital velocity in an orbit about the earth.

The constantly increasing amount of debris moving in space in an orbit about the earth presents considerable problems for future space travel, particularly for space stations.

So far, protective shields and casings have been proposed as passive protective measures but these add substantially to the mass of the satellites or space stations and offer only limited protection.

A further possibility would be to fly lower orbit altitudes but periodic acceleration would then be necessary in order to keep the space station at the altitude of the orbit about the earth.

As an active protective measure, it has so far been proposed that evading maneuvers be flown with the satellite or the space station. However, the expenditure involved herein is considerable. In particular, additional engine and propellant capacity is required and so the flying of evading maneuvers is only appropriate if there is a very large piece of debris on a collision course.

As a further possibility, it is conceivable to fly rendezvous maneuvers with a clearing vehicle to collect the pieces of debris. However, this involves an extremely high expenditure of energy and in view of the very large number of, in particular, small pieces of debris, is practically impossible.

The object underlying the invention is, therefore, to provide a method and a device for removing pieces of debris in space which function as simply as possible and are economical.

This object is accomplished in accordance with the invention with a method of the kind described at the beginning by the piece of debris being irradiated with radiation for bringing about vaporization of the debris material and by the piece of debris being removed from its orbit about the earth by the vaporization of the material.

The advantage of the inventive solution is to be seen in that it is readily possible to irradiate the piece of debris over larger distances and to remove it from its orbit about the earth by vaporization, thereby eliminating rendezvous maneuvers and evading maneuvers by a space station.

Hence in the simplest case a space station is provided with a corresponding device which operates in accordance with the inventive method and, therefore, removes in advance all the pieces of debris crossing its orbit or provision is made for the satellite or the space station to be employed in general for removing in accordance with the inventive method all the pieces of debris flying past within the range of the vaporizing radiation which can be emitted by it.

Within the scope of the inventive method, it is, for example, possible to completely reduce, in particular, atomize very small pieces of debris by the vaporization of the material and thereby remove them from their orbit about the earth.

In the case of larger pieces of debris, it is expedient, particularly in order that less radiation power will suffice, for the vaporization of the material to result in a debris remainder which is moved into a path which differs from the orbit about the earth by the recoil occurring during the vaporization of the material. The advantage of this procedure is that even quite large pieces of debris can be removed by vaporization of only a small portion thereof and acceleration of the debris remainder by exploitation of the recoil occurring during the vaporization, similar to the rocket principle, to move it out of its hitherto orbit about the earth.

It is particularly advantageous in an embodiment of the inventive method for the vaporization of the material to impart to the debris remainder an acceleration which changes its orbital velocity and, therefore, simultaneously influences its orbit.

Hence, in a simple way, the debris remainder is moved into a path of descent on which it enters the earth's atmosphere again and glows away in it, whereby the debris remainder is completely eliminated, or the debris remainder is moved into a path of escape on which it leaves the earth's gravitational field and wanders off into space and is thus likewise completely eliminated.

Such changes in the orbital velocity are preferably achieved by a beaming direction of the radiation which brings about vaporization of the debris material including an angle which differs from 90 degrees with the direction of the orbital velocity and the recoil which occurs during the vaporization of the material thus having a significant component in the direction of the orbital velocity or in the direction opposite to it.

It is particularly expedient for the beaming direction of the radiation bringing about vaporization of the debris material to include an angle of <60 degrees or even better <45 degrees with the direction of the orbital velocity. In this case, the resulting orbital velocity is reduced and the piece of debris thus preferably moved into the path of descent.

As an alternative to this, it is similarly advantageous for the beaming direction of the radiation bringing about vaporization of the debris material to include an angle of >120 degrees, in particular, >135 degrees with the direction of the orbital velocity. In this case, the acceleration owing to the vaporization of the material acts in the direction of the resulting orbital velocity and so the debris remainder is moved into a path of escape.

In order for as low power as possible to suffice, it has proven advantageous in an embodiment of the method for the radiation for vaporization of the material to be focussed on the piece of debris so as to achieve very strong heating of as small a region as possible of the piece of debris, the material of which then vaporizes.

It has, furthermore, proven expedient for the radiation to be beamed onto the piece of debris in the form of a train of pulses as the high energy then alloted in a simple way to the individual pulses of the radiation brings about vaporization of the debris material, whereas this would be problematic with continuous radiation.

In general, however, the irradiation of the piece of debris with continuous radiation to achieve vaporization of the debris material is not to be excluded from the scope of the inventive solution.

Details of the type of the radiation for bringing about vaporization of the debris material have still to be given. The only condition to be fulfilled is that the radiation be absorbed as well as possible by the debris material in order that the latter will heat up accordingly and vaporize. It is, for example, conceivable to use electron radiation for vaporization of the debris material.

In view of its handling and generation, electromagnetic radiation has, however, proven particularly suitable.

In an embodiment of the inventive method, laser radiation is preferably used as radiation for vaporization of the debris material as it can be generated with high power and applied to the piece of debris in a simple way.

In a further particularly preferred embodiment of the inventive method, an increase in the acceleration acting on the piece of debris is achievable by making an opening with plasma formation in the vapor of the debris material, i.e., with the radiation for vaporization of the debris material, the latter first vaporizes and then further absorption of the radiation applied to the piece of debris results in the opening with plasma formation in the cloud of vapor, which brings about an additional pressure wave which can be used to accelerate the piece of debris.

This can, for example, be achieved by vaporization of the debris material with a first radiation pulse, preferably a laser pulse, and creation of an opening with plasma formation in the vapor and the resulting pressure wave with a second, subsequent radiation pulse.

As an alternative to this, it is, however, also conceivable to bring about vaporization of the debris material with a first radiation source and to then produce the opening with plasma formation in the vapor with a second radiation source. This would have the advantage that the first radiation source could be adapted to the debris material with respect to its radiation absorbing characteristics and the second radiation source could be adapted with its type of radiation to the absorption characteristics of the vapor of the debris material. In the simplest case, for example, where a laser is used, this would mean that the first laser would have a wavelength which is optimally absorbed by the debris material and the second laser a wavelength which is optimally absorbed by the vapor of the debris material.

In the above description of the inventive method, it was not specified how the debris is to be identified in its orbit about the earth. In a preferred embodiment, provision is made for the piece of debris to be recognized and its path determined with radar. All of the commonly known radar methods used in space travel can be advantageously employed for this.

It is, however, particularly advantageous, in particular when electromagnetic radiation is used for vaporization of the debris material, for the piece of debris to be identified and its path determined with LIDAR.

With the LIDAR method, in a similar way as with radar, light is emitted and the reflection of the light by the piece of debris detected. This can be realized, in particular in a simple way, with a modification of the means for applying the radiation to the piece of debris for vaporization of the debris material.

Therefore, in the simplest case, provision is made for the laser which emits the laser radiation for vaporization of the material to be used as LIDAR beam source. This eliminates the necessity for provision of a second beam source for the LIDAR. In order to save power, provision is preferably made for the laser to operate with lower power or for the laser beam for the LIDAR method to be used in the defocused state.

Within the scope of the inventive method, it has proven particularly advantageous for the radiation for bringing about vaporization of the debris material to be generated with solar energy.

The object underlying the invention is likewise accomplished in accordance with the invention by a device for space vehicles for removing a piece of debris moving in space at an orbital velocity in an orbit about the earth, in particular a device for carrying out the procedures mentioned hereinabove, by the device comprising a radiation source for generation of the radiation for bringing about vaporization of the debris material, and by an aiming means being provided for applying the radiation to the piece of debris moving in the orbit about the earth.

The vaporization of the debris material can be brought about particularly expediently by the radiation being focussed on the piece of debris with an optical focusing means.

In particular, to enable irradiation of the piece of debris in its orbit over a longer period of time, it is, furthermore, advantageous for the aiming means to comprise a radiation-guiding optical means for following the piece of debris in its orbit about the earth with the radiation.

The radiation-guiding optical means can be controlled in many different ways. For example, manual control of the radiation-guiding optical means is conceivable. It is, however, also conceivable to control the radiation-guiding optical means on the basis of an estimated path of the piece of debris.

It is particularly advantageous for the aiming means to comprise an automatic target tracking means for constantly controlling the radiation-guiding optical means such that the radiation advantageously impinges on the piece of debris in the same region thereof and remains focussed thereon.

In this connection, it has proven expedient for the target tracking means to operate with non-linear optical elements.

In the simplest case, provision is made for the aiming means to comprise a mirror telescope.

In order not to constantly have to rotate the entire radiation source for following the piece of debris, provision is preferably made for the mirror telescope to be pivotable relative to the radiation source.

If a mirror telescope is used, it is appropriate for the focusing of the mirror telescope to be controlled by the aiming means so that the laser beam can, on the one hand, always be kept trained on the piece of debris with this mirror telescope and, on the other hand, can also be focussed by this mirror telescope.

In the above description of the embodiments of the inventive device, it was not specified exactly how the piece of debris is to be identified. Provision is preferably made for the aiming means to comprise a debris recognition means.

This debris recognition means can, for example, operate in a known way with radar.

It has, however, proven particularly expedient for the debris recognition means to operate with LIDAR.

A light source for the LIDAR can be saved by the LIDAR operating with the radiation for bringing about vaporization of the debris material. In this case, the inventive device can be expediently designed with respect to its weight and is, therefore, suitable for use in satellites and space stations.

Since the LIDAR does not require very high power, it can, for example, be operated with reduced laser power. It is, furthermore, expedient for the LIDAR to operate with the defocussed radiation for bringing about vaporization of the debris material.

Further details of the radiation source have still to be given.

It is particularly expedient for the radiation source to be a radiation source which generates electromagnetic radiation, preferably a laser.

Several variants are conceivable for the laser. Owing to the simple handling, it has proven advantageous for the laser to be a solid-state laser which, for example, can be pumped in the pulse mode with flash lamps.

However, this should not exclude use of other types of lasers, for example, gas lasers or chemical lasers which in view of their wavelength are advantageous in this respect over the solid-state laser.

The supplying of the inventive device with energy is preferably realized by the device being energized by solar cells.

Provision is preferably also made, in order to cover peak power requirements during operation of the laser, for the device to comprise an energy accumulator, in particular a capacitor bank.

Figure 2:
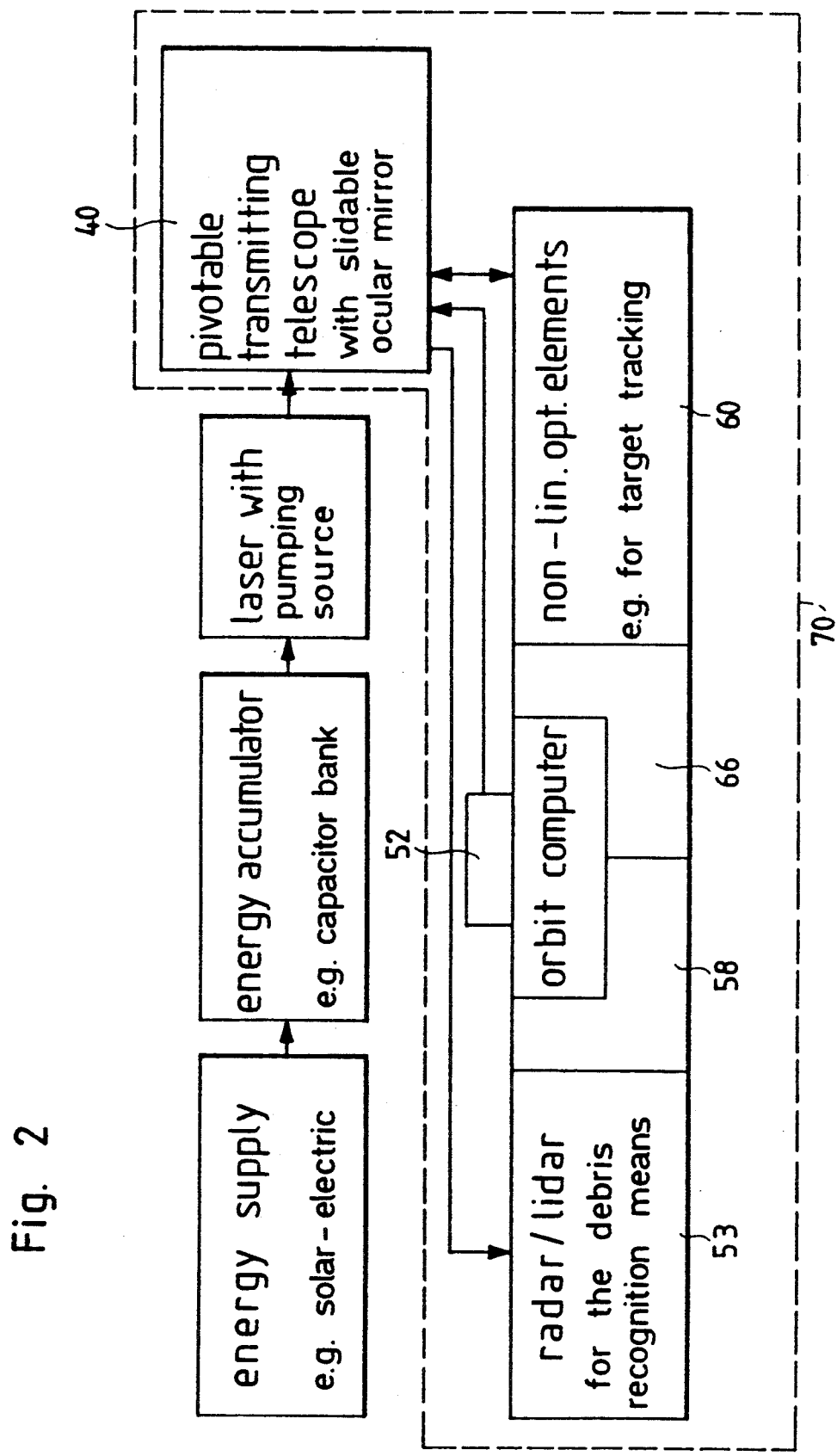

Further features and advantages of the invention are to be found in the following description and the appended illustrations of an embodiment of the inventive device and the inventive method. The drawings show:

FIG. 1 a schematic illustration of an inventive device as part of a clearing vehicle;

FIG. 2 a block-diagram-like illustration of the inventive device; and

Figure 3:
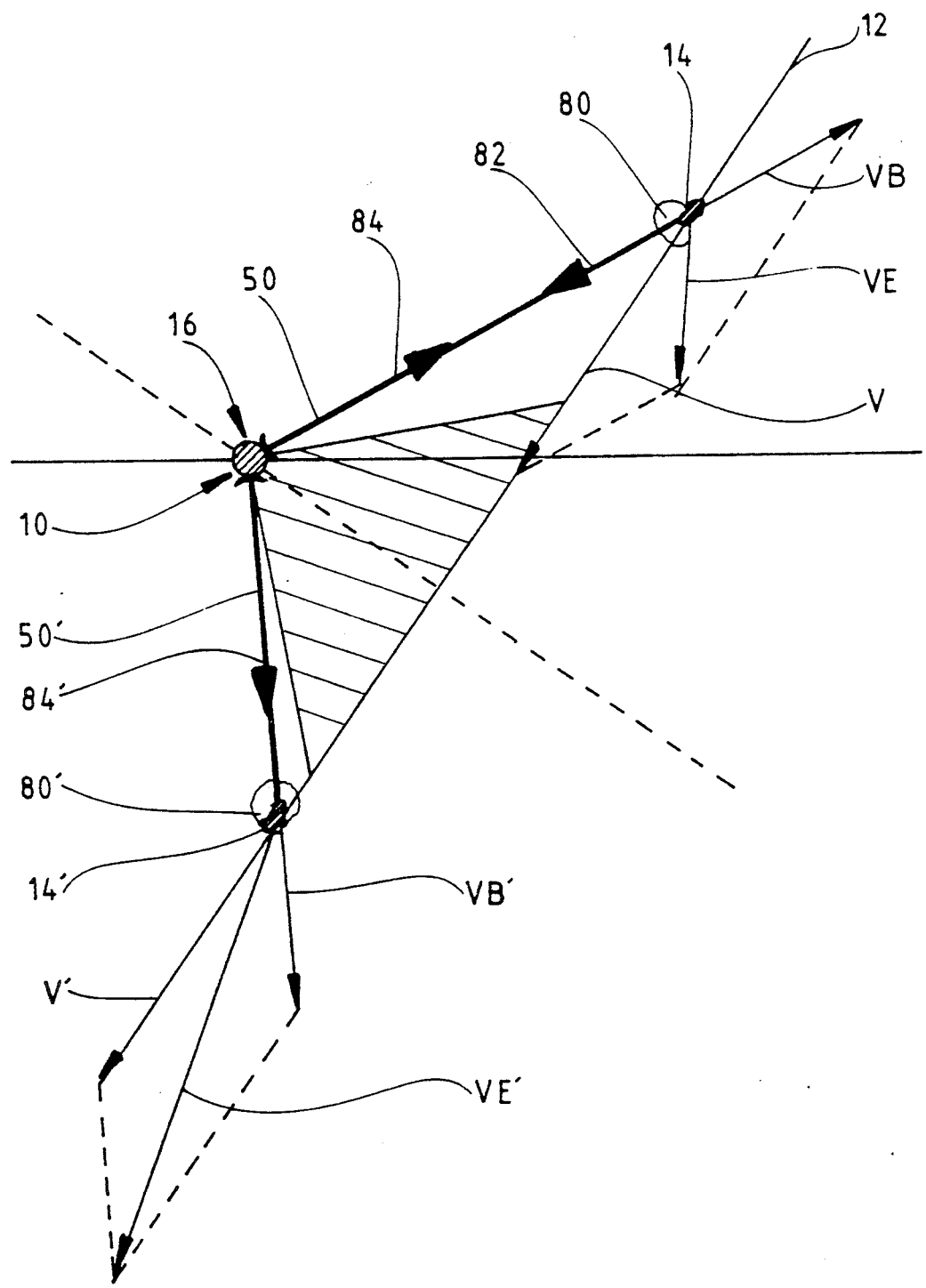

FIG. 3 performance of the inventive method on the basis of two case situations.

An embodiment, designated in its entirety 10 in FIG. 1, of an inventive device for the removal of a piece of debris 14 moving in space at an orbital velocity V in an orbit 12 is part of a clearing vehicle designated in its entirety 16 which, in addition to the inventive device, comprises an engine 18, for example, in the form of an ion engine, and a propellant tank 20 for this engine.

The inventive device comprises a laser designated in its entirety 22 which serves as radiation source and is fixedly mounted on the clearing vehicle 16. There emerges from this laser a first laser beam 24 which impinges upon a first deflection mirror 26 and is reflected from the latter onto a second deflection mirror 28 which, for its part, is arranged near a pivot center of a pivot joint 30. This pivot joint 30 comprises a joint part 32 fixedly connected to the clearing vehicle 16 and a joint part 34 pivotable relative to the clearing vehicle 16. The joint part 34 carries the second deflection mirror 28. A reflector mirror 38 of a mirror telescope designated in its entirety 40 is held by support rods 36 on this joint part 34. In addition to the reflector mirror 38, the mirror telescope comprises an ocular mirror 42 which is held on an adjusting means 44 which, in turn, is connected by support rods 46 to the reflector mirror 38 and the support rods 36.

The ocular mirror 42 and the reflector mirror 38 are arranged coaxially with an axis of symmetry 48 of the mirror telescope 40 which also intersects the second deflection mirror 28. The laser beam 24 impinging on the second deflection mirror 28 is reflected from the latter to the ocular mirror 42 symmetrically with the axis of symmetry 48. The ocular mirror 42, for its part, then reflects the incident laser beam 24 radially in relation to the axis of symmetry 48 onto the reflector mirror 38 of the mirror telescope 40 and a second laser beam 50 then travels from the latter to the piece of debris.

This second laser beam 50 can be focussed by the mirror telescope 40 on the piece of debris.

The focusing of the second laser beam 50 is carried out by the adjusting means 44 for the ocular mirror 42 which is movable along the axis of symmetry 48 by this adjusting means 44.

The entire mirror telescope 40 is pivotable relative to the clearing vehicle by the pivot joint 30 and so the laser beam 24 generated by the laser 22 fixedly connected to the clearing vehicle is pivotable as second laser beam 50 relative to the clearing vehicle 16 and can thus follow the orbit 12 of the piece of debris 14 about the earth.

The pivot part 34 is pivoted relative to the pivot part 32 by a pivot drive 52, not illustrated in detail, which is likewise fixedly held on the clearing vehicle 16 and carries the pivot part 32.

A debris recognition means which operates with LIDAR is provided for identifying the piece of debris 14. The debris recognition means comprises a sensor part 54 which receives radiation reflected back from the piece of debris 14 via a partially transmitting reflector element 56 arranged in the first laser beam 24. The reflector element 56 is arranged in the first laser beam 24 such that the light reflected from the piece of debris 14 is received by the mirror telescope 14 and travels along the path of the first laser beam 24 in the direction opposite to the latter towards the laser 22 and is reflected from this partially transmitting reflector element 56 into the sensor part 54.

The debris recognition means also comprises a first computer 58 which, together with the pivot drive 52, in particular the directional data of the piece of debris 14 relative to the clearing vehicle 16 provided by it, and the reflected light signals received by the sensor part 54, detects the position of the piece of debris 14 in its orbit 12 about the earth. In addition to the debris recognition means, designated in its entirety 53 in FIG. 2, there is a target tracking means which is designated in its entirety 60 in FIG. 2. This target tracking means likewise comprises a sensor part 62 which preferably has non-linear optical elements and likewise receives light reflected back from the piece of debris 14 via the mirror telescope 40 and the first laser beam 24 by means of a partially transmitting reflector element 64. The partially transmitting reflector element 64 is likewise arranged in the first laser beam 24, preferably between the laser 22 and the first deflection mirror 26.

In addition to this sensor part 62, there is a second computer 66 which likewise together with the sensor part 62, the pivot drive 52 and the adjusting means 44 for the ocular mirror 42, performs the target tracking which focusses the second laser beam 50 on the piece of debris 14.

The debris recognition means 53 and the target tracking means 60 form together with the pivotable mirror telescope 40, as a whole, an aiming means, designated in its entirety 70, of the inventive device 10.

The inventive device 10 is supplied with energy via solar wings 72 which supply an energy accumulator 74, preferably in the form of a capacitor bank, which, for its part, then controls the energy for the individual units of the inventive device 10.

The inventive device operates as follows:

As illustrated in FIG. 3, the piece of debris 14 is detected in its orbit 12 about the earth by the inventive device 10. To this end, the debris recognition means 53 operates with LIDAR, i.e., the laser 22 is operated with low power and the mirror telescope 40, driven by the pivot drive 52, is pivoted relative to the clearing vehicle 16 in order to scan with the second laser beam 50 the region in space opening up in front of the mirror telescope 40.

For reasons of simplicity, it will be assumed in the following description that the clearing vehicle 16 is standing. However, the inventive method can just as well be applied when a clearing vehicle 16 is moving at an orbital velocity in an orbit of its own about the earth. In this case, its velocity must also be taken into account.

When the defocussed laser beam 50 impinges on the piece of debris 14, this light is reflected by the piece of debris 14. This, in turn, is captured by the mirror telescope 40 and passed on to the sensor part 54 of the debris recognition means 53. This registers the received light signal in the first computer 58 and takes into account the position of the pivot drive 52. When the same method is carried out again after a time interval to register the new position of the piece of debris 14, the orbit 12 of the piece of debris 14 about the earth can then be calculated by the first computer 58.

With the target tracking means 60, the second laser beam 50 is simultaneously focussed on the piece of debris 14 by adjustment of the ocular mirror 42 by the adjusting means 44 and by pivoting of the mirror telescope 40 by the pivot drive 52 in accordance with the orbit 12 about the earth and the laser 22 is operated with full power.

The radiation energy for bringing about vaporization of the debris material which is applied by the laser 22 via the mirror telescope 40, focussed on the piece of debris 14, causes vaporization of the material of the piece of debris with formation of a vapor cloud 80, the direction of propagation 82 of which extends in the direction opposite to the direction of propagation 84 of the second laser beam 50. An acceleration is thereby imparted to the debris remainder 14 produced by the vaporization of the material in the direction of propagation 84 of the laser beam 50 and results in a velocity component VB in the direction of propagation 84.

The velocity component VB added vectorially to the velocity V of the piece of debris 14 thus results in a final velocity VE of the debris remainder which differs from the velocity V and is smaller than the velocity V when the direction of propagation 84 of the laser beam 50 includes with the velocity V an angle of <90 degrees as the velocity component VB then comprises a component opposite to the velocity V.

Owing to the lower final velocity VE imparted to the debris remainder and including an angle with the original velocity V, the debris remainder 14 has now left the orbit 12 of the piece of debris 14 about the earth.

In the simplest case, this may already suffice as the orbit of the piece of debris 14 can be altered to the extent that there will no longer be a collision with the clearing vehicle 16.

However, the final velocity VE is preferably so low and oriented relative to the velocity V such that the debris remainder reaches a path of descent, thereby enters the earth's atmosphere and glows away in it.

It is, however, also possible to remove a piece of debris when the direction of propagation 84' of the second laser beam 50' includes an angle >90 degrees with the velocity vector V of the piece of debris 14'. In this case, formation of the vapor cloud 80' results in an acceleration of the piece of debris 14' with a resulting velocity component VB' which, when added vectorially to the velocity V, results in a final velocity VE' which is greater than the velocity V, but likewise includes an angle with the velocity V.

In this way, the debris remainder 14' has likewise been made to leave the orbit 12 about the earth and, in addition, the final velocity VE' can be selected such that the debris remainder 14' reaches a path of escape and hence, leaving the earth's gravitational field, moves out into space.

The debris recognition means 53 preferably operates such that it only activates the aiming means 70 when the piece of debris 14 or 14' has moved relative to the inventive device 10 such that the direction of propagation 84 or 84' of the second laser beam 50 or 50' includes with the velocity vector V an angle which is either <45 degrees or >135 degrees as the final velocity VE or VE' can be increased or decreased in relation to the velocity V in a particularly advantageous way in these angle ranges.

In a particularly preferred embodiment of the inventive device 10, provision is made for the laser 22 to generate a train of laser pulses and for the wavelength of the laser pulses to be of such a nature that the second laser beam 50 produces the vapor cloud 80 or 80' with the first laser pulse and causes with one or several of the subsequent laser pulses in the vapor cloud 80 or 80' an opening with plasma formation which generates a substantially greater recoil than the recoil generated by the vapor cloud 80 or 80' by a pressure wave being created in the vapor cloud 80 or 80' during the plasma formation and additionally accelerating the piece of debris 14 or 14'.

Wavelengths of the laser 22 which are greater than 3 $\mu$m are particularly favorable for producing such an opening with plasma formation in the vapor cloud 80 or 80'.

In this case, $CO_2$ lasers with a wavelength of 10.6 $\mu$m or CO lasers with a wavelength of 5 $\mu$m would be suitable.

However, all kinds of solid-state lasers with wavelengths of from 0.7 to 1.1 $\mu$m or an iodine laser with a wavelength of 1.3 $\mu$m are also suitable. The advantage of the wavelengths of these lasers is to be seen in that the degree of reflection of metals, for example, aluminum, of which the pieces of debris will in all probability consist, increases with increasing wavelength and so vaporization of the material, for example, in the case of aluminum should preferably take place with a wavelength of 0.8 $\mu$m.

The ion engine 18 with the propellant tank 20 makes it possible for the inventive clearing vehicle 16 to reach a number of different orbits about the earth and to clear in the respective orbit it has reached the pieces of debris 14 flying in the region of this orbit.

Preferably an altitude range of between 350 and 1,800 km in which, according to present-day knowledge, the largest number of pieces of debris is to be found, can thereby be cleared.

Another preferred orbit range would be the geostationary orbit at an altitude of 36,000 km.

In a particularly preferred embodiment of the inventive device, the debris recognition means 53 is designed so as to detect the size of the respectively recognized piece of debris and irradiation thereof with the focussed laser beam 50 is only carried out if the size of the piece of debris is <10 cm. With this preferred design of the debris recognition means 53, damage to functioning satellites by the inventive clearing vehicle is avoided.

The present disclosure relates to the subject matter disclosed in German application No. P 39 43 374.9 of Dec. 30, 1989, the entire specification of which is incorporated herein by reference.

What is claimed is:

1. Method of removing a piece of debris moving in space at an orbital velocity in an orbit about the earth, comprising the steps of:
   generating radiation;
   irradiating the piece of debris with said radiation to bring about vaporization of the debris material, and
   removing the piece of debris from its orbit about the earth by the vaporization of the material.

2. Method as defined in claim 1, characterized in that a debris remainder is created during the vaporization of the material and is moved into a path differing from said orbit about the earth by the recoil which occurs during the vaporization of the material.

3. Method as defined in claim 2, characterized in that the vaporization of the material imparts to said debris remainder an acceleration which changes its orbital velocity.

4. Method as defined in claim 2, characterized in that said debris remainder is moved into a path of descent.

5. Method as defined in claim 2, characterized in that said debris remainder is moved into a path of escape.

6. Method as defined in claim 1, characterized in that a beaming direction of the radiation bringing about vaporization of the debris material includes with the direction of the orbital velocity an angle which differs from 90 degrees.

7. Method as defined in claim 1, characterized in that the radiation is focussed on said piece of debris to bring about vaporization of the material.

8. Method as defined in claim 1, characterized in that the radiation is beamed onto said piece of debris in the form of a train of radiation pulses.

9. Method as defined in claim 1, characterized in that electromagnetic radiation, in particular laser radiation, is used as radiation for bringing about vaporization of the debris material.

10. Method as defined in claim 1, characterized in that an opening with plasma formation is made in the vapor of the debris material.

11. Method as defined in claim 10, characterized in that the debris material is made to vaporize by a first radiation pulse and the opening with plasma formation is made in the vapor by a second, subsequent radiation pulse.

12. Method as defined in claim 1, characterized in that said piece of debris is identified and its path determined with radar.

13. Method as defined in claim 1, characterized in that said piece of debris is identified and its path determined with LIDAR.

14. Method as defined in claim 13, characterized in that the laser emitting the laser radiation which brings about vaporization of the material is used as LIDAR beam source.

15. Method as defined in claim 1, characterized in that the radiation bringing about vaporization of the debris material is generated with solar energy.

16. In combination with a space vehicle, a device for removing a piece of debris moving in space at an orbital velocity in an orbit about the earth, comprising:
   a radiation source for generating radiation for bringing about vaporization of the debris material,
   means for mounting said radiation source to and space vehicle, and
   aiming means provided on said space vehicle for applying the radiation to said piece of debris moving in said orbit about the earth.

17. Device as defined in claim 16, characterized in that the radiation can be focussed on said piece of debris with an optical focusing means.

18. Device as defined in claim 16, characterized in that said aiming means comprises a radiation-guiding optical means for following said piece of debris with the radiation in said orbit about the earth.

19. Device as defined in claim 18, characterized in that said aiming means comprises an automatic target tracking means for controlling said radiation-guiding optical means.

20. Device as defined in claim 19, characterized in that said target tracking means operates with non-linear optical elements.

21. Device as defined in claim 16, characterized in that said aiming means comprises a mirror telescope.

22. Device as defined in claim 21, characterized in that said mirror telescope is pivotable relative to said radiation source.

23. Device as defined in claim 21, characterized in that the focusing of said mirror telescope is controlled by said aiming means.

24. Device as defined in claim 16, characterized in that said aiming means comprises a debris recognition means.

25. Device as defined in claim 24, characterized in that said debris recognition means operates with LIDAR.

26. Device as defined in claim 25, characterized in that the LIDAR operates with the radiation which brings about the vaporization of the debris material.

27. Device as defined in claim 26, characterized in that the LIDAR operates with the defocussed radiation which brings about the vaporization of the debris material.

28. Device as defined in claim 16, characterized in that said radiation source is a laser.

29. Device as defined in claim 28, characterized in that said laser is a solid-state laser.

30. Device as defined in claim 16, characterized in that said device is energized by solar cells.

31. Device as defined in claim 16, characterized in that said device comprises an energy accumulator, in particular in the form of a capacitor bank.

* * * * *